(12) United States Patent
Matsushita et al.

(10) Patent No.: US 10,294,119 B2
(45) Date of Patent: May 21, 2019

(54) ZINC FERRITE FILM AND METHOD FOR MANUFACTURING ZINC FERRITE FILM

(71) Applicants: Shinko Electric Industries Co., Ltd., Nagano-ken (JP); Tokyo Institute of Technology, Tokyo (JP)

(72) Inventors: Nobuhiro Matsushita, Tokyo (JP); Yuji Tanaka, Tokyo (JP); Tomoki Kobayashi, Nagano (JP)

(73) Assignees: Shinko Electric Industries Co., LTD., Nagano-Ken (JP); Tokyo Institute of Technology, Tokyo (JP)

( * ) Notice: Subject to any disclaimer, the term of this patent is extended or adjusted under 35 U.S.C. 154(b) by 190 days.

(21) Appl. No.: 15/622,696

(22) Filed: Jun. 14, 2017

(65) Prior Publication Data

US 2017/0362091 A1    Dec. 21, 2017

(30) Foreign Application Priority Data

Jun. 16, 2016   (JP) .................. 2016-120035

(51) Int. Cl.
  *C01G 49/08*   (2006.01)
  *C01G 49/00*   (2006.01)
(52) U.S. Cl.
  CPC ...... *C01G 49/0063* (2013.01); *C01P 2002/32* (2013.01); *C01P 2002/60* (2013.01); *C01P 2002/80* (2013.01); *C01P 2004/54* (2013.01); *C01P 2006/42* (2013.01)
(58) Field of Classification Search
  CPC ............ C01G 49/0063; C01P 2002/60; C01P 2002/70

USPC ....................................... 252/62.56
See application file for complete search history.

(56) References Cited

U.S. PATENT DOCUMENTS

| | | | | |
|---|---|---|---|---|
| 4,681,637 A * | 7/1987 | Rademachers | .... | C01G 49/0063 106/425 |
| 5,062,991 A * | 11/1991 | Siiman | ................ | B01J 13/0013 252/62.51 R |
| 6,056,890 A * | 5/2000 | Cai | ..................... | C04B 35/2658 252/62.56 |
| 6,352,650 B1 * | 3/2002 | Inoue | ..................... | H01F 1/344 252/62.62 |
| 2003/0190471 A1 * | 10/2003 | Carpenter | ............. | B82Y 30/00 428/402 |
| 2012/0204949 A1 * | 8/2012 | Ho | ........................ | C25D 3/565 136/256 |

FOREIGN PATENT DOCUMENTS

| | | |
|---|---|---|
| JP | 2004-107696 A1 | 4/2004 |
| JP | 2006-108557 A1 | 4/2006 |
| WO | WO 2004/099464 A1 | 11/2004 |

* cited by examiner

*Primary Examiner* — Margaret G Moore
(74) *Attorney, Agent, or Firm* — Wolf, Greenfield & Sacks, P.C.

(57) ABSTRACT

A method for manufacturing a zinc ferrite film includes forming a zinc ferrite film on a base material by having a reaction liquid, which contains metal ions including only bivalent iron ions and bivalent zinc ions, contact an oxidation liquid, which contains an oxidant that oxidizes the metal ions, in the presence of a pH adjuster. The pH adjuster includes a carbonate of ammonium and an alkali metal salt of mono-carboxylic acid.

7 Claims, 2 Drawing Sheets

(Related Art)

ZINC FERRITE FILM AND METHOD FOR MANUFACTURING ZINC FERRITE FILM

CROSS-REFERENCE TO RELATED APPLICATIONS

This application is based upon and claims the benefit of priority from prior Japanese Patent Application No. 2016-120035, filed on Jun. 16, 2016, the entire contents of which are incorporated herein by reference.

FIELD

This disclosure relates to a method for manufacturing a zinc ferrite film and to a zinc ferrite film.

BACKGROUND

A ferrite film known in the art is used as a noise reduction material to reduce unnecessary radiated electromagnetic field noise from an electronic component and a core material to stably increase the inductance of a substrate-incorporated coil (inductor). The ferrite film is expressed by the composition formula of $M_xFe_{3-x}O_4$, where, for example, Ni, Zn, Co, or the like is used as M. International Patent Publication No. 2004/099464, Japanese Laid-Open Patent Publication No. 2006-108557, and Japanese Laid-Open Patent Publication No. 2004-107696 describe examples of ferrite films in the art.

A ferrite film that includes a number of metals other than iron such as nickel and zinc easily obtains the desired electric and magnetic characteristics. However, it is difficult to control reactions during the formation of the ferrite film. In this regard, a zinc ferrite film that includes only zinc in addition to iron allows reactions to be easily controlled during the formation of the ferrite film and is thus suitable for mass production. However, it is difficult to obtain the electric characteristic or magnetic characteristic required for a noise reduction material and a core material.

SUMMARY

One embodiment is a method for manufacturing a zinc ferrite film. The method includes forming a zinc ferrite film on a base material by having a reaction liquid, which contains metal ions including only bivalent iron ions and bivalent zinc ions, contact an oxidation liquid, which contains an oxidant that oxidizes the metal ions, in the presence of a pH adjuster. The pH adjuster includes a carbonate of ammonium and an alkali metal salt of mono-carboxylic acid.

Other embodiments and advantages thereof will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

Figure 1:
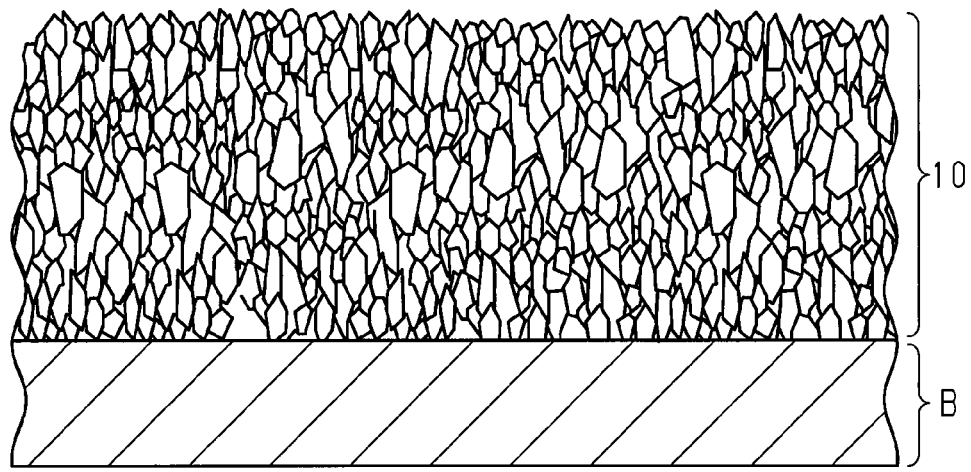
FIG. 1 is a schematic cross-sectional view illustrating a zinc ferrite film and a base material of one embodiment.

One embodiment will now be described with reference to the drawings. In the drawings, elements are illustrated for simplicity and clarity and have not necessarily been drawn to scale. To facilitate understanding, hatching lines may not be shown or be replaced by shadings in the cross-sectional drawings.

Figure 2:
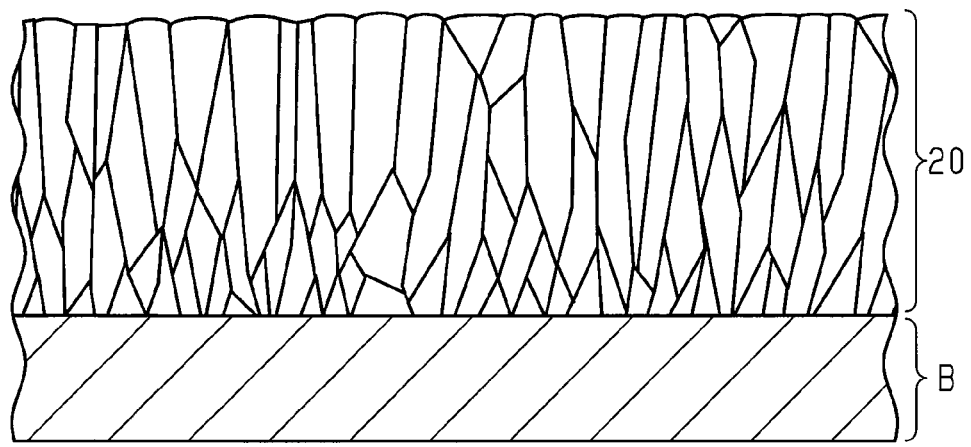
FIG. 2 is a schematic cross-sectional view illustrating a zinc ferrite film and a base material of the related art.

Referring to FIG. 1, a zinc ferrite film 10 of the present embodiment is formed on a base material B. The zinc ferrite film 10 is expressed by the composition formula of $Zn_xFe_{3-x}O_4$ and substantially does not contain metal elements other than iron and zinc. In $Zn_xFe_{3-x}O_4$, X is, for example, in the range from 0.2 to 1. The zinc ferrite film 10 has a spinel crystal structure. Further, the zinc ferrite film 10 is more vulnerable in the crystal orientation of the (111) plane than a zinc ferrite film 20 of the related art illustrated in FIG. 2.

The zinc ferrite film 10 of the present embodiment is mainly formed by microcrystal grains. More specifically, microcrystal grains occupy a higher proportion of the crystal grains in the zinc ferrite film 10 of the present embodiment than the zinc ferrite film 20 of the related art illustrated in FIG. 2.

In the zinc ferrite film 10 of the present embodiment, crystal grains having a grain diameter of less than 0.3 μm, which is expressed by an equivalent diameter, occupy 50% or greater of the crystal grains observed in a cross-section extending over a range having a thickness of 1.5 μm and a width of 10 μm. The crystal grains of the zinc ferrite film 10 were observed using the electron backscatter diffraction (EBSD) technique setting a boundary having an orientation difference of 5° or greater as the crystal grain boundary. The equivalent diameter is the diameter of a circle that has the same area as the crystal grain. That is, the equivalent diameter expresses the size of each crystal grain as the diameter of a circle.

The crystal grains having the grain diameter of less than 0.3 μm occupy, for example, preferably 60% or greater and further preferably 70% or greater of the crystal grains in the cross-section of the zinc ferrite film 10.

The thickness of the zinc ferrite film 10 is not limited to 1.5 μm and may be, for example, greater than 1.5 μm. When the thickness of the zinc ferrite film 10 is greater than 1.5 μm, the cross-section used to observe the crystal grains of the zinc ferrite film 10 may be set in a range extending over a thickness of 1.5 μm from the main surface of the base material B (surface on which zinc ferrite film 10 is formed) and a width of 10 μm along the main surface of the base material B. Preferably, the thickness of the zinc ferrite film 10 is, for example, 5 μm or less. Further preferably, the thickness of the zinc ferrite film 10 is 3 μm or less.

Preferably, the crystal grains having an aspect ratio of less than 0.2 occupy, for example, 10% or less of the crystal grains observed in the cross-section of the zinc ferrite film 10. Further preferably, the crystal grains having an aspect ratio of less than 0.2 occupy, for example, 8% or less of the crystal grains observed in the cross-section of the zinc ferrite film 10.

The base material B that is illustrated in a simplified manner in FIG. 1 may be selected in accordance with the purpose of application. The zinc ferrite film 10 may be applied as, for example, an electromagnetic field noise reduction material for electronic equipment. The electromagnetic field noise reduction material is used to form substrates for electronic circuits or housings for electronic components. Examples of the material for substrate include, for example, ceramics, silicon, prepreg, and an insulative resin such as a glass epoxy resin. The zinc ferrite film 10 of the present embodiment may also be used as the core material of a substrate-incorporated transformer or a substrate-incorporated inductor. The core material and the substrate in which electronic circuits are formed may be used for secondary mounting on a motherboard. The zinc ferrite film 10 may also be formed on another ferrite film.

The zinc ferrite film 10 is mainly formed by microcrystal grains. The zinc ferrite film 10 has better electric and magnetic characteristics than the zinc ferrite film 20 of the related art illustrated in FIG. 2.

A method for manufacturing the zinc ferrite film 10 will now be described.

The method for manufacturing the zinc ferrite film 10 in the present embodiment includes the step of forming the zinc ferrite film 10 on the base material B. In the formation step, a reaction liquid, which contains metal ions that are composed of bivalent iron ions and bivalent zinc ions, comes into contact with an oxidation liquid, which contains an oxidant that oxidizes metal ions, in the presence of a pH adjuster.

The concentration of the bivalent iron ions in the reaction liquid, under the condition that the concentration of the bivalent zinc ions in the reaction liquid is fixed, is preferably 10 mmol/L or greater and 50 mmol/L or less, and further preferably 20 mmol/L or greater and 50 mmol/L or less. When the concentration of bivalent iron ions in the reaction liquid is 10 mmol/L or greater, the reaction speed increases when forming the zinc ferrite film 10. This increases the film formation speed. When the concentration of bivalent iron ions in the reaction liquid is 50 mmol/L or less, the ion concentration of iron relative to zinc decreases. This restricts hopping conductance and decreases the conductivity, thereby allowing the resistance of the zinc ferrite film 10 to easily increase.

It is preferred that the concentration of the bivalent zinc ions in the reaction liquid be 0.2 mmol/L or greater and 1.0 mmol/L or less. When the concentration of the bivalent zinc ions in the reaction liquid is 0.2 mmol/L or greater, the magnetic permeability of the zinc ferrite film 10 easily increases. When the concentration of the bivalent zinc ions in the reaction liquid is 1.0 mmol/L or less, the saturated magnetization (Ms) of the zinc ferrite film 10 easily increases.

The reaction liquid is a water solution and may be prepared by dissolving, for example, iron(II) chloride and zinc chloride in water.

The oxidation liquid is a water solution and may be prepared by dissolving, for example, nitrite in water. Examples of nitrite include alkali metal salt of a nitrous acid and an ammonium salt of a nitrous acid. When using nitrite as an oxidant, the concentration of the nitrous acid ions in the oxidation liquid is preferably 1 mmol/L or greater and 10 mmol/L or less.

The pH adjuster includes a carbonate of ammonium and an alkali metal salt of mono-carboxylic acid. For example, at least one of ammonium carbonate and ammonium hydrogen carbonate may be used as a carbonate of ammonium of the pH adjuster. For example, at least one of potassium acetate and sodium acetate may be used as an alkali metal salt of mono-carboxylic acid of the pH adjuster. Preferably, the pH adjuster includes ammonium carbonate and at least one of potassium acetate and sodium acetate.

The pH adjuster may be a pH adjusting liquid that is separate from the reaction liquid and the oxidation liquid. Alternatively, the pH adjuster may be included in the oxidation liquid.

Preferably, the pH adjuster is included in the oxidation liquid and adjusts the pH of the oxidation liquid in the range of 5 or greater and 16 or less at a temperature of 25° C. Preferably, the pH adjuster is included in the oxidation liquid, the concentration of carbonate of ammonium in the oxidation liquid is 1 mmol/L or greater and 5 mmol/L or less, and the concentration of alkali metal salt of mono-carboxylic acid in the oxidation liquid is 10 mmol/L or greater and 100 mmol/L or less.

In the formation step, the reaction liquid contacts the oxidation liquid in the presence of the pH adjuster, for example, by immersing the base material B in the liquids such as the reaction liquid or by feeding the liquids such as the reaction liquid onto the base material B. In such a formation step, the reaction liquid, the oxidation liquid, or the pH adjusting liquid may be heated within a range in which carbonate of ammonium does not decompose.

As one example, a formation step that employs a spin spray process will now be described.

Figure 3:
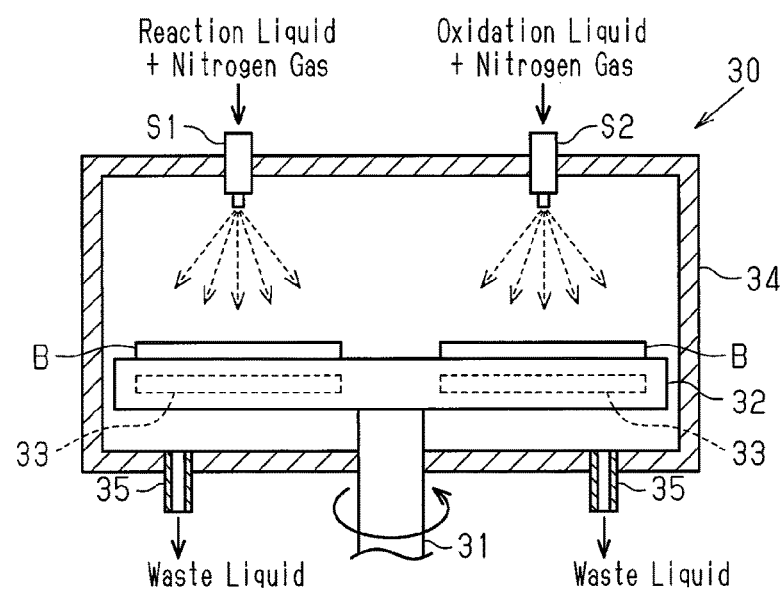
FIG. 3 is a schematic cross-sectional view illustrating one example of an apparatus that forms the zinc ferrite film.

FIG. 3 illustrates a spin spray apparatus 30 used to perform the formation step that employs the spin spray process. The spin spray apparatus 30 includes a rotary table 32, a first sprayer S1, and a second sprayer S2. The rotary table 32 is rotated about a rotation shaft 31. The first sprayer S1 sprays the reaction liquid toward the base material B that is fixed onto the rotary table 32. The second sprayer S2 sprays the oxidation liquid toward the base material B that is fixed onto the rotary table 32.

The rotary table 32 incorporates a heater 33 that heats the rotary table 32 and allows the temperature of the rotary table 32 to be controlled. The heater 33 heats the base material B that is fixed onto the rotary table 32. The rotation speed of the rotary table 32 is set in the range of, for example, 50 to 300 rpm. The heating temperature of the heater 33 is set in the range of, for example, 40° C. or greater and less than 100° C.

The spin spray apparatus 30 includes a container 34 that accommodates the rotary table 32. The interior of the container 34 is in a nitrogen gas atmosphere. The reaction liquid reacts with the oxidation liquid in the container 34. Nitrogen gas is fed into the container 34 together with the reaction liquid from the first sprayer S1. Nitrogen gas is also fed into the container 34 together with the oxidation liquid from the second sprayer S2. In the present embodiment, nitrogen gas is used as inert gas. For example, argon gas or the like may also be used as the inert gas. The bottom of the container 34 includes drain pipes 35. The rotation of the rotary table 32 produces centrifugal force that removes liquid from the base material B. The removed liquid is drained as waste liquid from the container 34 through the drain pipes 35.

In the formation step, metal ions that are adsorbed on the surface of the base material B are repetitively oxidized to form the zinc ferrite film 10 with a spinel crystal structure on the base material B. When the surface of the base material B has a low hydrophilicity, it is preferred that the surface of the base material B undergo a hydrophilic process such as a plasma process to accelerate the adsorption of metal ions.

For example, when the surface of the base material B includes a hydrophilic group such as the hydroxyl group, the hydrophilic process does not have to be performed.

In the method for manufacturing the zinc ferrite film 10, a cleaning step may be performed after the formation step when necessary to clean the zinc ferrite film 10.

The method for manufacturing the zinc ferrite film 10 uses a pH adjuster that includes a carbonate of ammonium and an alkali metal salt of mono-carboxylic acid. Such a pH adjuster repeats the oxidation of bivalent iron ions and bivalent zinc ions. This limits the formation of pillar-shaped crystals in the process during which zinc ferrite crystals grow. As a result, microcrystal grains occupy a higher proportion of the crystal grains in the obtained zinc ferrite film 10 (refer to FIG. 1). In contrast, when using a pH adjuster that includes only an alkali metal salt of mono-carboxylic acid, pillar-shaped crystal grains occupy a higher proportion of the crystal grains in the obtained zinc ferrite film 20 (refer to FIG. 2).

Test examples will now be described.

Test example 1 obtained a zinc ferrite film that was equivalent to the zinc ferrite film 10 of the present embodiment illustrated in FIG. 1. Test example 2 obtained a zinc ferrite film that was equivalent to the zinc ferrite film 20 of the related art illustrated in FIG. 2. In the following description about test examples 1 and 2, elements are not denoted with reference characters.

Test Example 1

<Preparation of Reaction Liquid>

Iron(II) chloride tetrahydrate and zinc chloride were dissolved in pure water to prepare a reaction liquid in which the concentration of iron(II) ions was 20 mmol/L and the concentration of zinc ions was 0.5 mmol/L.

<Preparation of Oxidation Liquid>

An oxidant, a carbonate of ammonium, and an alkali metal salt of mono-carboxylic acid were dissolved in pure water to prepare an oxidation liquid in which the concentration of potassium nitrite was 5.0 mmol/L, the concentration of the carbonate of ammonium was 1.5 mmol/L, and the concentration of the alkali metal salt of mono-carboxylic acid was 65 mmol/L. Sodium nitrite was used as the oxidant. Ammonium carbonate was used as the carbonate of ammonium. Sodium acetate was used as the alkali metal salt of mono-carboxylic acid. The prepared oxidation liquid had a pH of 9 (25° C.)

<Formation of Zinc Ferrite Film>

A zinc ferrite film was formed on a base material with the spin spray apparatus. As the base material, a solder resist-added glass epoxy substrate, which serves as a test base material, was used. In the spin spray apparatus, the rotation speed of the rotation table was set to 150 rpm, and the heating temperature of the heater was set to 90° C. The temperature of the reaction liquid and the oxidation liquid was the room temperature (20° C. to 25° C.). The reaction liquid and the oxidation liquid were respectively sprayed from the first sprayer and the second sprayer. The sprayed amount of the reaction liquid and the sprayed amount of the oxidation liquid were set by the flow rate of the nitrogen gas supplied to the first sprayer and the second sprayer. More specifically, the flow rate of the nitrogen gas supplied to the first sprayer and the second sprayer was set to 7.5 L/min.

The molar ratio of iron and zinc included in the obtained zinc ferrite film was measured by conducting a wet ICP analysis. The composition of the zinc ferrite film was $Zn_{0.48}Fe_{2.52}O_4$.

Test Example 2

In test example 2, a zinc ferrite film was formed in the same manner as test example 1 except in that the pH adjuster was changed. The oxidation liquid of test example 2 did not include a carbonate of ammonium. In the oxidation liquid, the concentration of the oxidant was 5.0 mmol/L, and the concentration of an alkali metal salt of mono-carboxylic acid was 65 mmol/L. Sodium nitrite was used as the oxidant. Potassium acetate was used as the alkali metal salt of mono-carboxylic acid.

The molar ratio of iron and zinc included in the obtained zinc ferrite film was measured by conducting a wet ICP analysis. The composition of the zinc ferrite film was $Zn_{0.18}Fe_{2.82}O_4$.

Comparison of Test Example 1 and Test Example 2

Test example 1 and test example 2 were compared with regard to the items listed in table 1.

TABLE 1

| | | Test Ex. 1 | Test Ex. 2 |
|---|---|---|---|
| Formation Speed [nm/min] | | 70 | 40 |
| Crystal Grain | Proportion [%] (Crystal Grain Diameter Less Than 0.3 μm) | 81.9 | 33.1 |
| | Proportion [%] (Aspect Ratio Less Than 0.2) | 5.8 | 14.3 |
| Magnetic Permeability | $\mu'$ (Average Value of 1 MHz to 10 MHz) | 57.3 | 26.4 |
| | $\mu''$ (Peak Value) | 57.1 | 19.0 |
| | Rising Gradient of $\mu''$ ($\Delta\mu''/\Delta$MHz) | 0.66 | 0.04 |
| Surface Resistance | Before Reflow [Ω/sqr] | $8.66 \times 10^7$ | $2.13 \times 10^7$ |
| | After Reflow [Ω/sqr] | $2.76 \times 10^5$ | $4.10 \times 10^3$ |

In table 1, the line labeled "Formation Speed" indicates the formation speed of the zinc ferrite film obtained in each example. The zinc ferrite film obtained in test example 1 had a higher formation speed than the zinc ferrite film obtained in test example 2.

In table 1, the lines labeled "Crystal Grain" indicate the observation results obtained from the zinc ferrite film of each example setting a boundary having an orientation difference of 5° or greater as the crystal grain boundary in the electron backscatter diffraction technique. In the zinc ferrite film obtained in test example 1, the proportion of crystal grains having a crystal grain diameter of 0.3 μm was higher than that of the zinc ferrite film obtained in test example 2. Further, in the zinc ferrite film obtained in test example 1, the proportion of crystal grains having an aspect ratio of less than 0.2 was lower than that of the zinc ferrite film obtained in test example 2.

Figure 4:
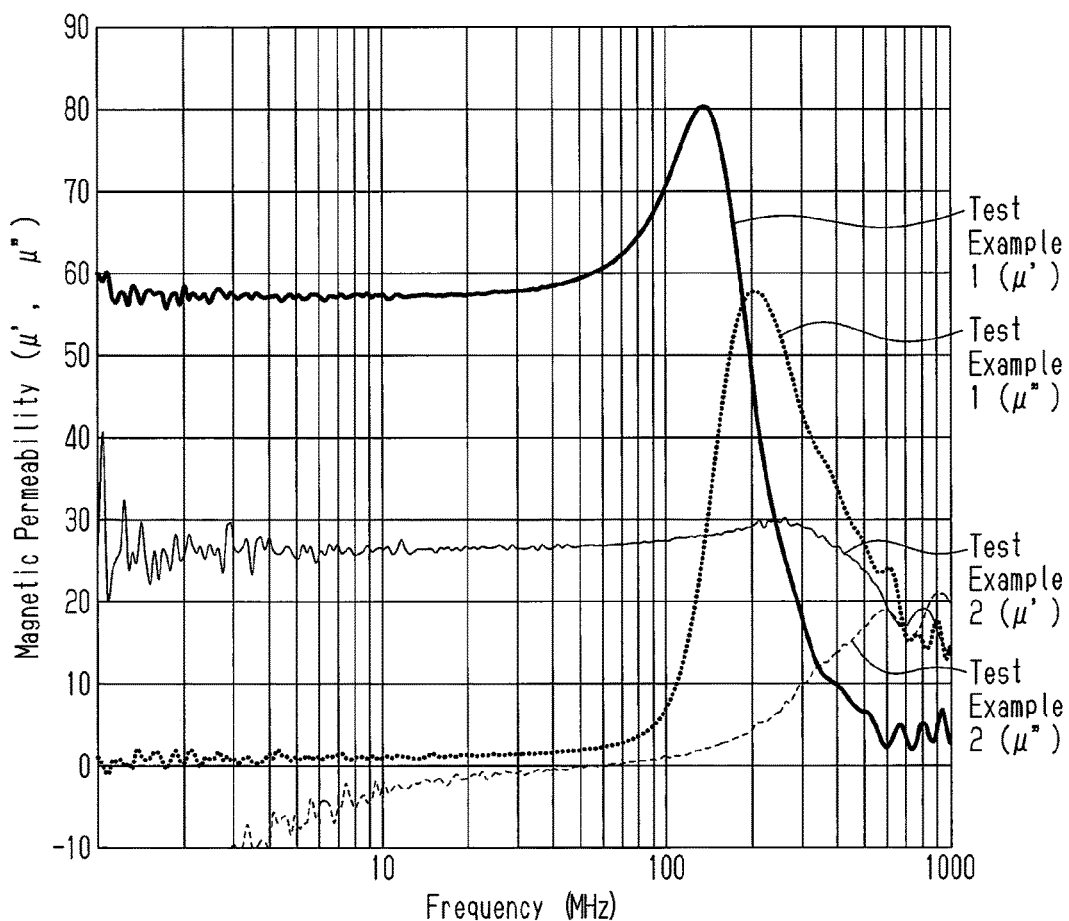
FIG. 4 is a graph illustrating the relationship between the frequency and the magnetic permeability in the zinc ferrite film.

FIG. 4 is a graph illustrating the relationship of the frequency and the magnetic permeability in the zinc ferrite films of test example 1 and test example 2. The lines labeled "Magnetic Permeability" in table 1 indicate the comparison results of the real components $\mu'$ and the imaginary components $\mu''$ of the complex magnetic permeability in the graph of FIG. 4.

The real components $\mu'$ of the zinc ferrite film obtained in test example 1 are higher than that of the zinc ferrite film obtained in test example 2. From this result, it can be understood that the noise reduction effect of the zinc ferrite film obtained in test example 1 was superior to the noise reduction effect of the zinc ferrite film obtained in test example 2. The use of the zinc ferrite film of test example 1, which has such characteristics, as the core material is advantageous in that the performance can be improved and the device size can be reduced.

The imaginary components $\mu''$ of the zinc ferrite film obtained in test example 1 had a higher peak value than the zinc ferrite film obtained in test example 2. From this result, it can be understood that the transmitted noise reduction effect and the emitted noise reduction effect of the zinc ferrite film obtained in test example 1 was superior to the zinc ferrite film obtained in test example 2.

The rising gradient $\Delta\mu''/\Delta MHz$ of the imaginary components $\mu''$ of the zinc ferrite film obtained in test example 1 was greater than that of the zinc ferrite film obtained in test example 2. From this result, it can be understood that the noise attenuation effect of the zinc ferrite film obtained in test example 1 was superior to that of the zinc ferrite film obtained in test example 2.

The lines labeled "Surface Resistance" in table 1 indicate the surface resistance before and after the reflow process for the zinc ferrite film obtained in each example. The surface resistance was measured before and after the zinc ferrite film-added base material passed through a reflow furnace (maximum temperature 260° C.) that was set to have a temperature profile for lead-free solder. The dimensions of the zinc ferrite film-added base material that underwent the surface resistance measurement were as follows. The width was 1.5 mm, the length was 20 mm, and the thickness of the zinc ferrite film was 1.56 µm (thickness of base material was 0.2 mm). The average value of the resistance measured at the two longitudinal ends of each of the zinc ferrite film-added base materials was calculated as the surface resistance.

The surface resistance of the zinc ferrite film obtained in test example 2 was decreased by the reflow process to the order of $10^3$ Ω/sqr. In contrast, the surface resistance of the zinc ferrite film obtained in test example 1 was maintained at the order of $10^5$ Ω/sqr even after the reflow process. The zinc ferrite film obtained in this manner in test example 1 remained practically insulative even after the reflow process. This limits short-circuiting and current leakage even in a secondary mounting circuit substrate.

The present embodiment has the advantages described below.

(1) The method for manufacturing the zinc ferrite film 10 includes the step of forming the zinc ferrite film 10 on the base material B. In the formation step, a reaction liquid containing metal ions that include only bivalent iron ions and bivalent zinc ions comes into contact with an oxidation liquid containing an oxidant that oxidizes the metal ions in the presence of a pH adjuster. The pH adjuster used in the formation step includes a carbonate of ammonium and an alkali metal salt of mono-carboxylic acid. This method forms fine crystal grains in the zinc ferrite film 10 so that the zinc ferrite film 10 has good electric and magnetic characteristics. Further, the zinc ferrite film 10 has a higher formation speed than the zinc ferrite film 20 of the related art. This shortens the manufacturing time of a product that includes the zinc ferrite film 10. In this manner, products including the zinc ferrite film 10 have a high productivity and are suitable for mass production.

(2) In the zinc ferrite film 10, crystal grains having a grain diameter of less than 0.3 µm occupy 50% or greater of the crystal grains observed in a cross-section extending over a range having a thickness of 1.5 µm and a width of 10 µm.

This structure obtains good electric and magnetic characteristics. Further, the surface resistance of the zinc ferrite film 10 is easily maintained even after a reflow process. Thus, the zinc ferrite film 10 is applicable to secondary mounting purposes (insulation film or core material for circuit substrate).

It should be apparent to those skilled in the art that the foregoing embodiment may be embodied in many other specific forms without departing from the scope of this disclosure.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of this disclosure.

The invention claimed is:

1. A method for manufacturing a zinc ferrite film, the method comprising:
   forming a zinc ferrite film on a base material by having a reaction liquid, which contains metal ions including only bivalent iron ions and bivalent zinc ions, contact an oxidation liquid, which contains an oxidant that oxidizes the metal ions, in the presence of a pH adjuster;
   wherein the pH adjuster includes a carbonate of ammonium and an alkali metal salt of mono-carboxylic acid.

2. The method according to claim 1, wherein the pH adjuster includes ammonium carbonate and at least one of potassium acetate and sodium acetate.

3. The method according to claim 1, wherein
   concentration of the bivalent iron ions in the reaction liquid is 10 mmol/L or greater and 50 mmol/L or less, and
   concentration of the bivalent zinc ions in the reaction liquid is 0.2 mmol/L or greater and 1.0 mmol/L or less.

4. The method according to claim 1, wherein
   the pH adjuster is included in the oxidation liquid, and
   the oxidation liquid has a pH adjusted in the range of 5 or greater and 16 or less at a temperature of 25° C.

5. The method according to claim 1, wherein
   the pH adjuster is included in the oxidation liquid,
   concentration of the carbonate of ammonium in the oxidation liquid is 1 mmol/L or greater and 5 mmol/L or less, and
   concentration of the alkali metal salt of mono-carboxylic acid in the oxidation liquid is 10 mmol/L or greater and 100 mmol/L or less.

6. A zinc ferrite film comprising
   crystal grains observed using an electron backscatter diffraction technique setting a boundary having an orientation difference of 5° or greater as a crystal grain boundary, wherein 50% or greater of the crystal grains observed in a cross-section of the zinc ferrite film extending over a range having a thickness of 1.5 µm and a width of 10 µm are occupied by crystal grains having a grain diameter of less than 0.3 µm, which is expressed by an equivalent diameter.

7. The zinc ferrite film according to claim 6, wherein 10% or less of the crystal grains observed in the cross-section are occupied by crystal grains having an aspect ratio of less than 0.2.

* * * * *